United States Patent [19]
Oakley

[11] 3,775,190
[45] Nov. 27, 1973

[54] DUPLEX ELECTRODE CONSTRUCTION USING CONTINUOUS ELECTRICALLY NONCONDUCTIVE CARRIER STRIP

[76] Inventor: Daniel C. Oakley, c/o E.S.B. Incorporated, P.O. Box 8109, Philadelphia, Pa. 19101

[22] Filed: Mar. 27, 1972

[21] Appl. No.: 238,694

Related U.S. Application Data

[62] Division of Ser. No. 100,269, Dec. 21, 1970, Pat. No. 3,723,181.

[52] U.S. Cl. .................................................. 136/175
[51] Int. Cl. ............................................... H01m 1/00
[58] Field of Search .................. 136/111, 175, 10, 136/12

[56] References Cited
UNITED STATES PATENTS

| | | | |
|---|---|---|---|
| 2,705,253 | 3/1955 | Kirkman | 136/111 |
| 2,649,492 | 8/1953 | Linton et al. | 136/111 |
| 2,831,046 | 4/1958 | Linton | 136/175 |
| 2,844,641 | 7/1958 | Lang et al. | 136/175 |
| 3,004,094 | 10/1961 | Haessly | 136/175 |

*Primary Examiner*—Donald L. Walton
*Attorney*—Robert H. Robinson et al.

[57] ABSTRACT

Duplex electrodes are constructed by placing intermittent deposits of positive and negative electrodes on opposite sides of a continuous, electrically nonconductive carrier strip. Electrically conductive material on both sides of and extending through holes in the nonconductive strip is used to conduct current between the positive and negative electrodes. The duplex electrodes are assembled into multicell batteries, preferably while the duplex electrodes are structurally connected by the continuous carrier strip; the carrier strip is then subsequently cut between duplex electrodes to obtain structurally unconnected batteries. Alternatively, the carrier strip may be cut between duplex electrodes before those electrodes are assembled into multicell batteries.

7 Claims, 6 Drawing Figures

DUPLEX ELECTRODE CONSTRUCTION USING CONTINUOUS ELECTRICALLY NONCONDUCTIVE CARRIER STRIP

CROSS-REFERENCE TO RELATED APPLICATION

This is a division of application Ser. No. 100,269 filed Dec. 21, 1970, now U. S. Pat. 3,723,181.

Background of the Invention

1. Field of the Invention

This invention concerns duplex electrodes (also known as bipolar electrodes) in which deposits of positive and negative electrodes are intermittently placed on opposite sides of a continuous, electrically nonconductive carrier strip. Electrically conductive material on both sides of and extending through holes in the nonconductive strip is used to conduct current between the positive and negative electrodes. Both the methods of constructing duplex electrodes and multicell batteries and the resultant products are claimed.

2. Description of the Prior Art

In the construction of a multicell battery three essential requirements must be met: a member which is impervious to the electrolyte of the battery must be used between adjacent cells to seal one cell from the next; some means must be provided by which electrical current may be conducted between the positive electrode in one cell and the negative electrode in an adjacent cell; and the electrolyte impervious member and the electrical conductor means must not create any undesired reactions in the battery. Other desirable attributes are that there be low electrical resistances between the positive electrode of one cell and the negative electrode of an adjacent cell and that the battery be constructed using inexpensive materials and methods.

One technique for constructing multicell batteries is with the use of duplex electrodes, also known as bipolar electrodes. A duplex electrode is a separately constructed assembly in which an electrolyte impervious, electrochemically nonreactive member which eventually divides one cell from an adjacent cell is surrounded on one side with a positive electrode and on the other side with a negative electrode. After being so constructued, the duplex electrode is subsequently assembled into a multicell battery. While the electrolyte impervious, electrochemically nonreactive member will also meet the third essential requirement if it is made from an electrically conductive material, if it is not itself electrically conductive then some separate conductor must be used which extends through or around the edge of the nonconductive, impervious, nonreactive member.

SUMMARY OF THE INVENTION

With this invention duplex electrodes are constructed by placing positive and negative electrodes in contact with opposite sides of a continuous, electrically nonconductive carrier strip. Electrically conductive material on both sides of and extending through holes in the nonconductive strip is used to conduct between the positive and negative electrodes. The combination of a segment of the nonconductive strip and the conductive material extending through the segment meets the requirements of being electrolyte impervious, providing intercell electrical conducting means, and avoiding undesired electrochemical reactions in the battery. Use of the carrier strip as a substrate permits the positive and negative electrodes to be made from compositions which, during the construction of the duplex electrode, are unable or poorly suited to be constructed as continuous strips.

The positive and negative electrodes are applied in intermittent deposits along the carrier strip with a deposit of positive electrode being placed opposite a deposit of negative electrode. During this construction process the resulting duplex electrodes are structurally connected together, a feature which is desirable because high speed production machinery is better able to receive continuous strips of stock than individual pieces. The duplex electrodes are then assembled into multicell batteries, preferably while the duplex electrodes are structurally connected by the continuous carrier strip; the carrier strip is then subsequently cut between duplex electrodes to obtain structurally unconnected batteries. Alternatively, the carrier strip may be cut between duplex electrodes before those electrodes are assembled into multicell batteries.

DESCRIPTION OF THE PREFERRED EMBODIMENTS

Figure 1:
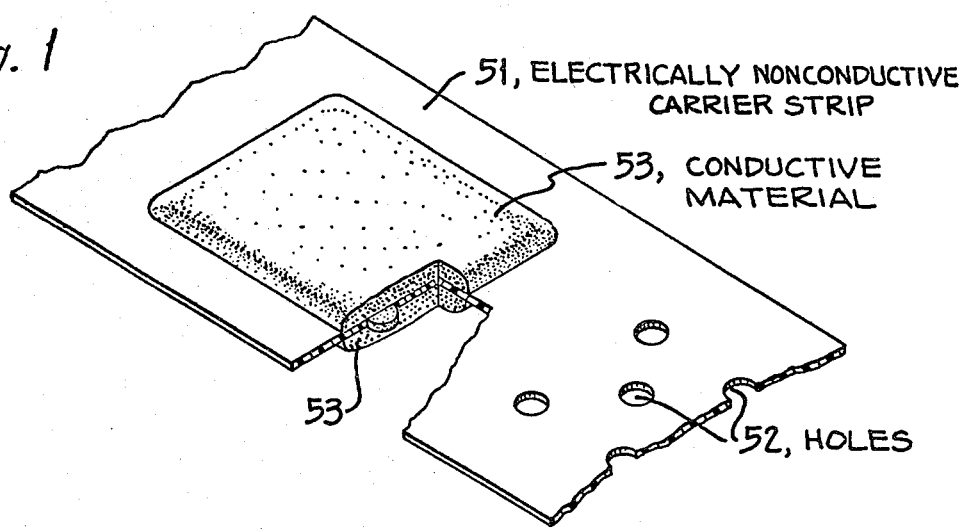
FIG. 1 shows a portion of an electrically nonconductive carrier strip with electrically conductive material such as conductive adhesive on both sides of and extending through holes in the strip.
Figure 2:
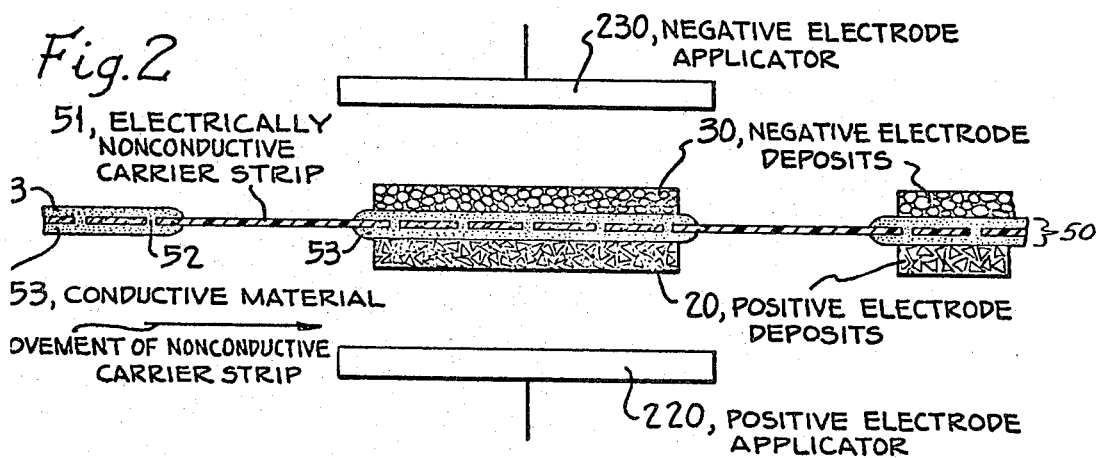
FIG. 2 is a schematic diagram showing a continuous strip of the nonconductive material with its associated conductive material being passed by applicators which place intermittent deposits of positive and negative electrodes in contact with the conductive material on both sides of the strip.

As shown in FIGS. 1 and 2, the construction of duplex electrodes 50 according to this invention begins with a continuous carrier strip of an electrically nonconductive material 51 through each segment of which extends at least one hole 52. Electrically conductive means or material 53 such as a conductive adhesive is on both sides of and extends through the hole or holes 52. While the conductive means could extend continuously along the continuous strip, it is shown in the drawings as being applied intermittently. The continuous carrier strip with the conductive means thereon is first passed by positive and negative electrode applicators 220 and 230, respectively, where the applicators place intermittent deposits of positive and negative electrodes 20 and 30, respectively, on opposite sides of the carrier strip from each other and in contact with the conductive material 53. Each deposit of negative electrode is substantially opposite a deposit of positive electrode. The applicators 220 and 230 may be spaced opposite one another so that they make their opposing deposits simultaneously, or they may be spaced apart so that one applicator first makes its deposit and later the other applicator makes the opposing deposit. It will be understood by those skilled in the art that the combination of a segment of the carrier strip, the conductive means on both sides of and extending through the segment, and the positive and negative electrodes on opposite sides of the segment collectively comprise a duplex electrode, also known as a bipolar electrode.

The step illustrated in FIG. 2 and described above results in a plurality of duplex electrodes which are structurally connected together by the continuous carrier strip. The duplex electrodes are subsequently assembled into multicell batteries, preferably while they are still connected together as a continuous tape but alternatively after the continuous tape has been cut into structurally unconnected segments each of which is a duplex electrode.

Figure 3:
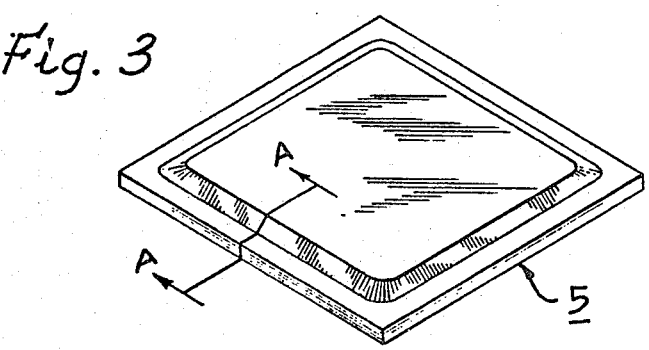
FIG. 3 is a oblique view of a multicell battery containing duplex electrodes made according to this invention.
Figure 4:
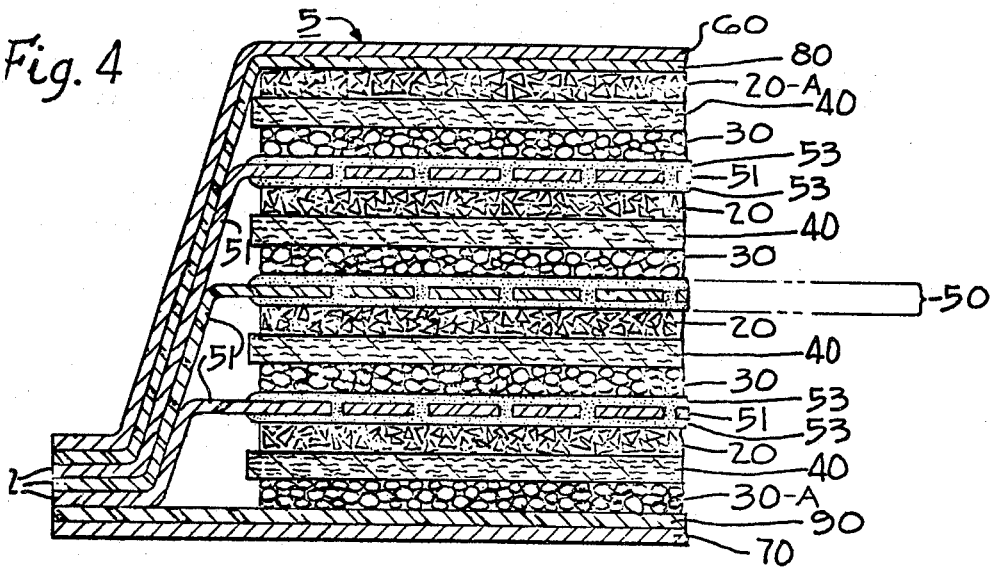
FIG. 4 illustrates a cross-section of the battery shown in FIG. 3 taken along the line A—A of FIG. 3. The thickness of the battery is shown greatly magnified for purposes of illustration.

FIGS. 3 and 4 show a multicell battery 5 which contains three of the duplex electrodes 50 and which is structurally unconnected to any other multicell battery. The battery may be assembled while each of the three duplex electrodes in a segment of a separate continuous carrier strip of the type illustrated in FIG. 2, after which the assembled batteries are cut so as to be structurally unconnected to each other; or it may be produced using duplex electrodes each of which is structurally unconnected to another duplex electrode during the assembly.

In the preferred assembly process, multicell batteries are assembled which are structurally connected together by at least one of the continuous carrier strips. Referring to FIGS. 2 through 4, this assembly method would, for example, place three of the continuous carrier strips produced as shown in FIG. 2 between outer positive electrodes 20-A and outer negative electrodes 30-A so that a duplex electrode 50 along each of the continuous carrier strips is between the outer electrodes. During the assembly an electrolyte impregnated separator 40 would be placed between each positive electrode 20 and 20-A and each negative electrode 30 and 30A after which a seal would be made around the perimeter of each electrolyte impregnated separator to produce a liquid impervious seal at the perimeter. A convenient but not the only way to achieve the seal is simply to heat seal those portions of the nonconductive carrier strips which are in between the intermittent deposits of conductive means, and such a seal 102 is shown in FIG. 4. If an adhesive used as the conductive means 53 is applied continuously along the carrier strip, this adhesive may also be used as the sealing means around the perimeter of each duplex electrode. Liquid impervious layers 80 and 90 which also function as current conducting means are in contact with the outer electrodes 20-A and 30-A respectively. Metal current collectors 60 and 70 which also function as vapor barriers are on the outside of layers 80 and 90. Electrically conductive means must be connected to the outer positive and negative electrodes 20-A and 30-A to conduct current between those electrodes and the exterior of the liquid impervious layer, a matter to be discussed again in the paragraphs to follow. Some or all of the components other than the duplex electrodes may be assembled into the multicell batteries while segments of continuous strips, if desired.

After the structurally connected batteries are so assembled by this preferred method, they may be cut between the segments or duplex electrodes of the continuous carrier strips if desired so as to obtain structurally unconnected multicell batteries. The carrier strip may be cut between each successive pair of duplex electrodes, or it may be cut into increments each of which contains two or more duplex electrodes so that the resultant multicell batteries are structurally connected by the increment.

As suggested above, as an alternative process the structurally connected duplex electrodes produced as shown in FIG. 2 may be cut into structurally unconnected electrodes before being assembled into multicell batteries if that is desired. At least one such duplex electrode would subsequently be assembled into a multicell battery, this process possibly using some other member of the finally constructed batteries as a continuous carrier strip during the assembly. For instance, the outside layers 60 and 70 could be continuous carrier strips and the duplex electrodes, electrolyte impregnated separators, and outer electrodes could then be placed along those continuous strips, with the cutting of those strips to produce structurally unconnected multicell batteries being postponed until after all other assembly steps have been concluded.

Numerous advantages result from the construction illustrated schematically in FIG. 2 and described above. The essential requirements and desirable attributes referred to in the Background are achieved. The nonconductive material 51 and conductive means 53 are impervious to the electrolyte and thus prevent electrolyte migration from one cell to another. The conductive means 53 conducts current from one cell to another while introducing only low electrical resistance and without creating any undesired electrochemical reactions. The nonconductive material 51 and conductive means 53 may be made from inexpensive materials and may be combined with inexpensive methods.

The use of the continuous carrier strip as a substrate along which intermittent deposits of electrodes are applied is also advantageous from the viewpoint of manufacturing techniques. Modern, high speed production machinery is frequently better able to apply such deposits along a continuous strip than to apply deposits to a succession of individual pieces. Maximum advantage of this principle may be attained in the preferred method of assembling batteries described above, that is by using the continuous strip as a processing implement throughout the construction of the multicell batteries, leaving the step of cutting the carrier strip into segments until all other assembly steps required to construct the multicell batteries have been taken.

Figure 5:
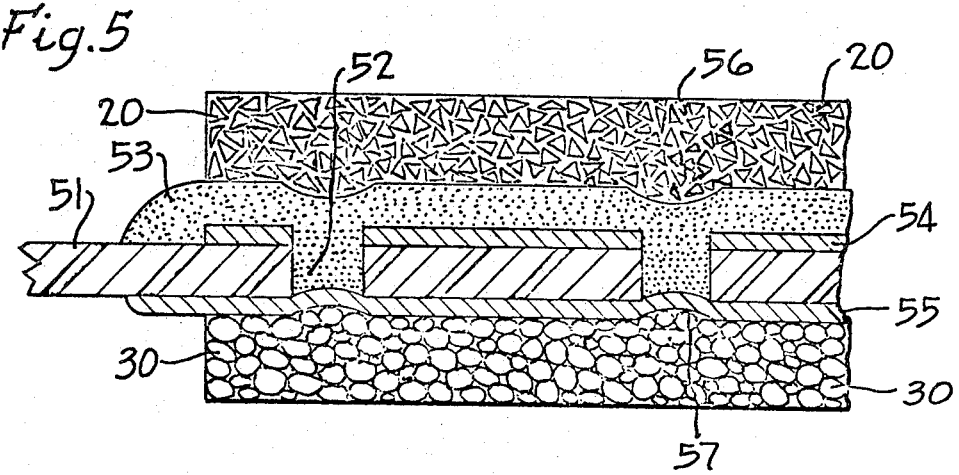
FIG. 5 is a magnified cross-section of a duplex electrode in which a conductive material such as conductive adhesive is on one side of and extends through holes in the nonconductive strip and a different conductive material such as metal is on the other side of the strip.
Figure 6:
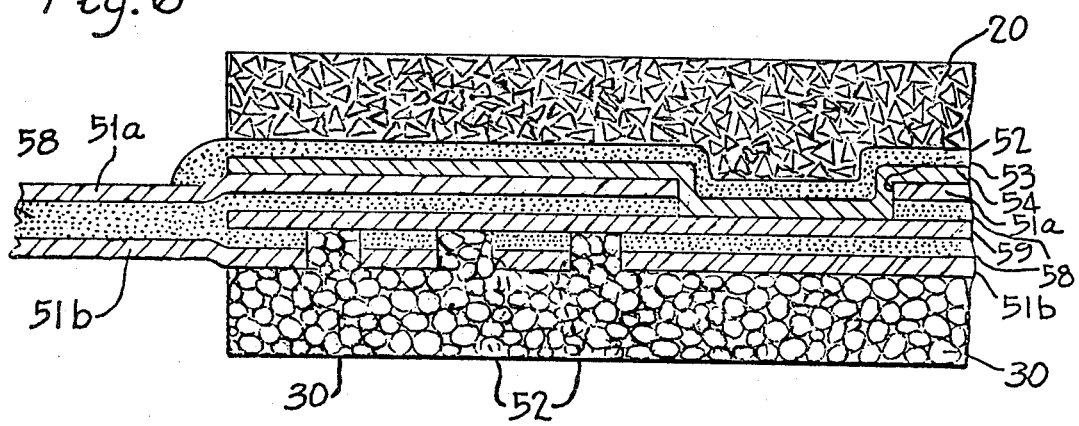
FIG. 6 is a magnified cross-section of a duplex electrode having two layers of nonconductive material each of which layers is provided with at least one hole. Conductive materials extend through the holes in both nonconductive layers to make electrical contact with conductive means positioned between the plastic layers.

For purposes of this invention, a duplex electrode is defined as comprising the combination of a segment of electrically nonconductive strip 51, electrically conductive means on both sides of and extending through at least one hole in the segment, a positive electrode in contact with the conductive means on one side of the segment, and a negative electrode in contact with the conductive means on the other side of the segment. The drawings illustrate several alternative embodiments of such duplex electrodes. In FIGS. 1, 2, and 4 there is shown a duplex electrode 50 in which the only conductive means or material 53 used is a conductive adhesive such as pressure sensitive rubber-based or vinyl-based adhesives which are loaded with carbonaceous materials such as graphite or acetylene black or loaded with metallic powders or flakes or needles of such materials as copper or silver. Alternatively, the adhesive base may be thermosensitive and include such materials as vinyl copolymers or ethylene vinyl acetate or a mixture of the latter with waxes. Polymers which by themselves are sufficiently conductive may also be used. FIG. 5 illustrates an alternative construction in which conductive adhesive 53 is on the side of the nonconductive material 51 nearest the positive electrode 20; the adhesive also extends into the holes 52 in the nonconductive plastic. On the positive and negative electrode sides of the nonconductive material 51 are additional conductive means 54 and 55 respectively such as foils or deposits of metal including zinc, aluminum, tin or gold which may be used if desired to improve the electrical conductivity between electrodes 20 and 30. The conductive adhesive shown in FIG. 5 may be pressed into the holes 52 if desired to assure both a good electrical connection and a liquid-tight seal through the holes, the pressing possibly resulting in deformations 56 and 57 as shown in the drawing. Still another alternative appears in FIG. 6, one in which two layers of the nonconductive material, 51a and 51b, are used. Conductive means, shown in FIG. 6 as being the same conductive adhesive 53 and metal 54 which appear in FIG. 5, extend through at least one hole 52 in layer 51a. Through at least one hole 52 in layer 51b negative electrode material 30 extends to function as additional conductive means. Between the two nonconductive layers 51a and 51b are still additional conductive means 58 and 59 which may be conductive plastic and metal, respectively, these additional means being in electrical contact with those extending through the holes 52 in layers 51a and 51b. The constructions shown in both FIGS. 5 and 6 are ones in which the relatively good electrical conductivity of metals may be utilized advantageously without having the metal produce any undesired electrochemical reactions after the duplex electrode has been assembled into a multicell battery. Constructions using other design combinations of non-conductive material and conductive means may also be used.

While the drawings illustrate each deposit of electrical conductor extending through several holes in the nonconductive carrier, this invention also contemplates use of a single hole through the carrier for each electrical conductor deposit. Such a single hole may, if desired, be substantially larger than the ones illustrated in the drawings, extending to substantially the same length and width of the electrical conductor deposit if desired.

The nonconductor from which the carrier strip is made may be selected from a wide variety of materials. Thermoplastic materials which may be used include polyolefins such as: polyethylene and polypropylene; polystyrene; acrylonitryl butadiene styrene; polyamides such as nylon; and combinations of thermoplastic films made by methods such as coextrusion. Also useful are thermosetting materials such as: phenolics; polyurethane film; rubbers; epoxy films and silicones. Still other materials which may be used include: glass; and fibrous, cellulosic sheet films impregnated with many of the nonconductive thermoplastic and thermosetting materials listed above.

The composition of several of the other members in the battery may take alternative forms, and the compositions of those members will be discussed.

The positive electrodes 20 and 20-A may each comprise particles of electrochemically positive active material contained in and dispersed throughout a binder matrix. The positive active material conventionally is divided into tiny particles so as to increase the ratio of total surface area to weight in the active material and thereby increase the rate at which the electrochemical reactions can occur by increasing the surface areas where they occur. The binder increases the internal electronic conductivity of the duplex electrodes and increases the structural integrity within the positive electrodes. Since the electrolyte must have access to the surface of the active material particles the electrode must be made sufficiently porous so that the electrolyte may diffuse throughout the electrode rapidly and thoroughly. Preferably the pores in the electrode are produced by the evaporation of liquid during the construction of the electrode; the evaporating liquid may be part of a dispersion binder system in which the solid binder contained in the finally constructed electrode comprises tiny particles of binder material dispersed throughout and not dissolved in the liquid while the electrode is being constructed, or the evaporating liquid may be part of the solution binder system in which the solid binder contained in the finally constructed electrode is dissolved in the liquid which is later evaporated. The porosity of the positive electrodes may be increased as the discharge rate desired in the battery is increased. Electrodes may also be constructed using combinations of the dispersion and solution systems. Alternatively, the pores might be produced by the dissolving of a solid which was present during construction of the electrode or by passing gases through or generating gases within the electrodes at controlled rates during electrode construction. The positive electrodes 20 and 20-A may, and preferably will, also contain amounts of a good electrical conductor such as carbon or graphite to improve the electrical conductivity between the active material particles, the positive active material particles themselves generally being relatively poor conductors of electricity. The conductivity of the active material particles together with the conductivity of the binder itself will influence the amounts of conductors added to the electrode. The electrodes 20 and 20-A may also contain if desired small amounts of additional ingredients used for such purposes as maintaining uniform dispersion of active material particles during electrode construction, aiding the diffusion of electrolyte through the pores of the finally constructed electrodes, controlling viscosity during processing, controlling surface tension, controlling pot life, or for other reasons.

The negative electrodes 30 and 30-A comprise spray or vapor deposits of metals or may comprise tiny particles of metals contained in and dispersed throughout a binder matrix. If the negative electrodes utilize a binder matrix, in general the same considerations regarding that matrix apply to the negative electrodes as do for the positive electrodes except that no electrical conductor may be needed to achieve desired electrical conductivity between the active material particles since the negative active materials are generally better conductors than are the positive materials. When the negative electrodes utilize a binder matrix, the binder system need not be the same as the one used in the positive electrodes, and even if it is the proportions of binder, active material particles, and other ingredients in the negative electrodes may have a different optimum than the proportions of analogous ingredients in the positive electrode. The initial porosity of the negative electrodes may sometimes be less than that of the positive electrodes, since the negative electrode discharge reaction products are sometimes dissolved in the battery electrolyte. The porosity of the negative electrodes may be increased as the discharge rate desired in the battery is increased. The negative electrodes 30 and 30-A may also comprise thin sheets or foils of electrochemically negative material.

It is apparent that electrodes which comprise particles of active material would be unable or poorly suited to be produced as continuous strips. They should therefore be deposited upon a substrate which, in the case of this invention, is the electrically nonconductive carrier strip with the conductive means thereon.

Between each positive electrode 20 or 20-A and each negative electrode 30 or 30-A is an electrolyte impregnated separator 40, the theoretical requirements of which are that it contain electrolyte as well as physically separate and prevent contact between the surrounding electrodes. A deposit of gelled electrolyte could by itself serve both functions if of proper thickness and/or consistency. The alternative construction uses a deposit of gelled or fluid electrolyte with a separator which is distinct from and in addition to the electrolyte, the separator providing added insurance against direct contact between the electrodes and acting as an absorbent material into which the electrolyte may be impregnated. Both alternative constructions may, however be viewed as being forms of electrolyte impregnated separators. Where the separator is distinct from and in addition to the electrolyte, the separator may be made from a wide variety of materials including the fibrous and cellulosic materials which are conventional in battery construction as well as from woven or non-woven fibrous materials such as polyester, nylon polypropylene, polyethylene and glass.

Another essential of the multicell battery 5 is a liquid impervious layer comprising members 80 and 90 sealed around the electrodes and electrolyte impregnated separators as shown in FIG. 3. When a battery is in storage waiting to be placed into service there is an opportunity for liquids from the electrolyte to escape from the battery, leaving the battery incapable of performing as desired when later placed into use. Also during discharge the battery may produce liquid by products which are corrosive, poisonous, or otherwise harmful, and it is desirable to prevent these liquids from escaping from the battery. The liquid impervious layer provides means for preventing or minimizing the loss of these liquids.

The multicell battery 5 must also be provided with means for conducting electrical current between the outer positive electrode 20-A and the exterior of the liquid impervious layer and additional means for conducting electrical current between the outer negative electrode 30-A and the exterior of the liquid impervious layer. This additional requirement of the battery may be met by the liquid impervious layer members 80 and 90 themselves by constructing those members from a conductive material such as an electrochemically inert, electrically conductive plastic, and such a construction is shown in FIG. 3. As an alternative to the conductive plastic, metals which are either themselves electrochemically nonreactive or are made so by appropriate conductive, nonreactive coatings may be used for the liquid impervious layer. Another alternative construction not illustrated in the drawings is to use a liquid impervious layer which is made from an electrically nonconductive material and then extend separate conductive means from the end electrodes 20-A and 30-A through or around the edge of the nonconductive, liquid impervious layer so that current may be withdrawn from the battery. It is to be understood that all of these alternative constructions are encompassed by the general statement that a liquid impervious layer is sealed around the electrodes and electrolyte impregnated separators, that electrically conductive means are connected to the outer positive electrode 20-A which extend to the exterior of the liquid impervious layer, and that additional electrically conductive means are connected to the outer negative electrode 30-A which extend to the exterior of the liquid impervious layer.

Two additional components, members 60 and 70, are shown in FIG. 3 and are illustrated because they may be used in the construction of the multicell battery produced by this invention. It should be understood, however, that the present invention does not require the use of members 60 and 70. Those members are metal foils or sheets, e.g., steel foil, which function both as vapor barriers to prevent evaporation of electrolyte from the battery and as current collecting means. Where a nonmetallic, nonconductive vapor barrier is used instead of steel foil, additional means must be provided to conduct current from the exterior of the liquid impervious layer (members 80 and 90) to the exterior of the vapor barrier. Where vapor barriers such as the members 60 and 70 shown in FIG. 3 are used with the battery, they may be laminated to the liquid impervious layers 80 and 90 if desired.

While it is preferred to employ the LeClanche electrochemical system (comprising manganese dioxide positive active material, zinc negative active material, and an electrolyte comprising ammonium chloride and/or zinc chloride), the multicell battery 5 of this invention may employ a wide variety of positive and negative electrode materials and a wide variety of electrochemical systems including both primary and secondary systems. Among the positive electrode materials are such commonly used inorganic metal oxides as manganese dioxide, lead dioxide, nickel oxyhydroxide, mercuric oxide and silver oxide, inorganic metal halides such as silver chloride and lead chloride and organic materials capable of being reduced such as dinitrobenzene and azodicarbonamide compounds. Among the negative electrode materials are such commonly used metals as zinc, aluminum, magnesium, lead, cadmium, and iron. This invention may employ the electrolytes commonly used in the LeClanche system (ammonium chloride and/or zinc chloride), various alkaline electrolytes such as the hydroxides of potassium, sodium and/or lithium, acidic electrolytes such as sulfuric or phosphoric acid, and nonaqueous electrolytes, the electrolytes of course being chosen to be compatible with the positive and negative electrodes.

Among the wide variety of electrochemical systems which may be used in the multicell battery 5 are those in which the positive electrodes comprise manganese dioxide, the negative electrodes comprise metals such as zinc, aluminum, or magnesium, and the electrolyte substantially comprises an acidic solution of inorganic salts. Another commonly known system useful in the battery 5 is the alkaline manganese system in which the positive electrodes comprise a manganese dioxide solution, the negative electrodes comprise zinc, and the electrolyte substantially comprises a solution of potassium hudroxide. Other aqueous electrolyte systems including those of nickel-zinc, mercury-zinc, mercury cadmium, and nickel-cadmium may also be used. Systems employing organic positive electrodes and acidic electrolytes may also be used, including rechargeable systems using azodicarbonamide compound electrodes and LeClanche electrolyte.

I claim:

1. The method of constructing duplex electrodes which are structurally connected together by a continuous carrier strip of electrically nonconductive material, each duplex electrode comprising the combination of a segment of the strip, electrically conductive means on both sides of and extending through holes in the segment, a positive electrode in contact with the conductive means on one side of the segment, and a negative electrode in contact with the conductive means on the other side of the segment, the method comprising the steps of:
   a. placing positive electrodes along segments of the carrier strip, each segment having electrically conductive means on both sides of and extending through holes in the segment; and,
   b. placing negative electrodes along the carrier strip, each negative electrode being on the other side of a segment from and substantially opposite a positive electrode.

2. The method of constructing multicell batteries comprising the steps of:
   a. constructing duplex electrodes which are structurally connected together by a continuous carrier strip of electrically nonconductive material, each duplex electrode comprising the combination of a segment of the strip, electrically conductive means on both sides of and extending through holes in the segment, a positive electrode in contact with the conductive means on one side of the segment, and a negative electrode in contact with the conductive means on the other side of the segment, the method of constructing the duplex electrodes comprising the steps of
      i. placing positive electrodes along segments of the carrier strip, each segment having electrically conductive means on both sides of and extending through holes in the segment, and
      ii. placing negative electrodes along the carrier strip, each negative electrode being on the other side of a segment and substantially opposite a positive electrode; then,
   b. assembling multicell batteries which are structurally connected together by at least one of the continuous carrier strips having positive and negative electrodes thereon, the method of assembling the multicell batteries comprising the steps of
      i. placing at least one of the carrier strips having positive and negative electrodes thereon between outer positive electrodes and outer negative electrodes so that each duplex electrode is between an outer positive electrode and an outer negative electrode.
      ii. placing an electrolyte impregnated separator between each of the outer electrodes and the duplex electrodes,
      iii. sealing arond the perimeter of each electrolyte impregnated separator to produce a liquid impervious seal,
      iv. sealing a liquid impervious layer around the electrodes and electrolyte impregnated separators, and
      v. connecting to the outer positive electrode electrically conductive means which extend to the exterior of the liquid impervious layer and connecting to the outer negative electrode additional electrically conductive means which extend to the exterior of the liquid impervious layer.

3. The method of claim 2 together with the additional subsequent step of cutting the carrier strip between segments to obtain structurally unconnected multicell batteries.

4. The method of constructing multicell batteries comprising the steps of:
   a. constructing duplex electrodes which are structurally connected together by continuous carrier strip of electrically nonconductive material, each duplex electrode comprising the combination of a segment of the strip, electrically conductive means on both sides of and extending through holes in the segment, a positive electrode in contact with the conductive means on one side of the segment, and a negative electrode in contact with the conductive means on the other side of the segment, the method of constructing the duplex electrodes comprising the steps of
      i. placing positive electrodes along segments of the carrier strip, each segment having electrically conductive means on both sides of and extending through holes in the segment, and
      ii. placing negative electrodes along the carrier strip, each negative electrode being on the other side of a segment from and substantially opposite a positive electrode; then,
   b. cutting the carrier strip between duplex electrodes to obtain structurally unconnected duplex electrodes; and then,
   c. assembling a multicell battery containing at least one of the structurally and electrically unconnected duplex electrodes by
      i. placing at least one of the structurally and electrically unconnected duplex electrodes between an outer positive electrode and an outer negative electrode,
      ii. placing an electrolyte impregnated separator between each of the outer electrodes and the duplex electrodes,
      iii. sealing around the perimeter of each electrolyte impregnated separator to produce a liquid impervious seal,
      iv. sealing a liquid impervious layer around the electrodes and electrolyte impregnated separators, and
      v. connecting to the outer positive electrodes electrically conductive means which extend to the exterior of the liquid impervious layer and connecting to the outer negative electrode additional electrically conductive means which extend to the exterior of the liquid impervious layers.

5. The method of constructing multicell batteries using a continuous carrier srtrip of electrically nonconductive material, the strip of carrier material having segments through which holes extend, the segments of carrier strip having electrically conductive means on both sides and extending through the holes thereof, the segments also having a positive electrode in contact with the conductive means on one side thereof and having a negative electrode in contact with the conductive means on the other side thereof, the method comprising the steps of
 a. placing the carrier strip between outer positive and outer negative electrodes so that a positive electrode on the carrier strip faces an outer negative electrode and so that a negative electrode on the carrier strip faces an outer positive electrode;
 b. placing an electrolyte impregnated separator between each of the other electrodes and the duplex electrodes;
 c. sealing liquid impervious layers around the electrodes deposited on the carrier strip so that each electrode on the carrier strip is surrounded by a liquid impervious seal; and,
 d. connecting to each outer positive electrode electrically conductive means which extend to the exterior of the liquid impervious layers and connecting to each other negative electrode additional electrically conductive means which extend to the exterior of the liquid impervious layers.

6. The method of claim 5 in which the carrier strip is subsequently cut between the segments having electrodes thereon to obtain structurally unconnected multicell batteries.

7. The method of constructing multicell batteries using a continuous carrier strip of electrically nonconductive material, the strip of carrier material having segments through which holes extend, the segments of carrier strip having electrically conductive means on both sides and extending through the holes thereof, the segments also having a positive electrode in contact with the conductive means on one side thereof and having a negative electrode in contact with the conductive means on the other side thereof, the method comprising the steps of
 a. cutting the carrier strip to obtain structurally unconnected segments; and then
 b. assembling a multicell battery by
   i. placing at least one of the structurally unconnected segments between an outer positive electrode,
   ii. placing an electrolyte impregnated separator between each of the outer electrodes and the duplex electrode,
   iii. sealing around the perimeter of each electrolyte impregnated separator to produce a liquid impervious seal,
   iv. sealing a liquid impervious layer around the electrodes and electrolyte impregnated separators, and
   v. connecting to the outer positive electrode electrically conductive means which extend to the exterior of the liquid impervious layer and connecting to the outer negative electrode additional electrically conductive means which extend to the exterior of the liquid impervious layer.

* * * * *